US012538061B2

(12) United States Patent
Law

(10) Patent No.: US 12,538,061 B2
(45) Date of Patent: Jan. 27, 2026

(54) SOUNDBAR WITH WIRELESS EARPHONES

(71) Applicant: Shenzhen Weiking Technology Co., Ltd., Guangdong (CN)

(72) Inventor: Fuguang Law, Guangdong (CN)

(73) Assignee: Shenzhen Weiking Technology Co., Ltd., Shenzhen (CN)

( * ) Notice: Subject to any disclaimer, the term of this patent is extended or adjusted under 35 U.S.C. 154(b) by 217 days.

(21) Appl. No.: 18/231,800

(22) Filed: Aug. 9, 2023

(65) Prior Publication Data

US 2024/0056717 A1 Feb. 15, 2024

(30) Foreign Application Priority Data

Aug. 9, 2022 (CN) ......................... 202222100782.9

(51) Int. Cl.

*H04R 25/00* (2006.01)
*H04R 1/10* (2006.01)
*H04R 5/02* (2006.01)

(52) U.S. Cl.

CPC ......... *H04R 1/1025* (2013.01); *H04R 1/1016* (2013.01); *H04R 5/02* (2013.01); *H04R 2201/103* (2013.01); *H04R 2420/07* (2013.01); *H04R 2420/09* (2013.01)

(58) Field of Classification Search

CPC ....... H04R 1/1025; H04R 1/1016; H04R 5/02
See application file for complete search history.

(56) References Cited

U.S. PATENT DOCUMENTS

| | | | | |
|---|---|---|---|---|
| 10,951,736 | B1 * | 3/2021 | Nocon | G02B 27/0172 |
| 2009/0221234 | A1 * | 9/2009 | Pirzada | H04B 1/713 455/41.2 |
| 2009/0238396 | A1 * | 9/2009 | Lin | H04R 5/02 381/370 |
| 2019/0130923 | A1 * | 5/2019 | Elliot | G10L 19/008 |
| 2020/0241830 | A1 * | 7/2020 | Fischer | H04B 10/1149 |

* cited by examiner

*Primary Examiner* — Simon King

(57) ABSTRACT

A soundbar with wireless earphones includes a soundbar housing, a storage compartment provided in the soundbar housing, a storage groove formed in the storage compartment, and a wireless earphone fittingly mounted in the storage groove. A pogo pin is disposed in the storage groove, and a corresponding connecting contact is provided on the wireless earphone. The connecting contact is electrically connected to the pogo pin to form a charging path when the wireless earphone is placed in the storage groove. A mainboard is provided in the soundbar housing, and an audio Bluetooth module is integrated on the mainboard for associating with an equipment. The wireless earphone is in communicating connection with the soundbar through the audio Bluetooth module. The wireless earphone is connected to the soundbar for audio interaction. Different methods for using in different scenarios provide users with more choices.

10 Claims, 4 Drawing Sheets

SOUNDBAR WITH WIRELESS EARPHONES

CROSS REFERENCE TO RELATED APPLICATIONS

The present application claims the benefit of Chinese Patent Application No. 202222100782.9 filed on Aug. 9, 2022, the contents of which are incorporated herein by reference in their entirety.

TECHNICAL FIELD

The present application relates to the technical field of audio equipment, in particular to a soundbar with wireless earphones.

BACKGROUND TECHNOLOGY

With the improvement of living standards, every household is basically equipped with a television. The current television basically uses the method of audio playback, and the sound is loud and clear. However, watching television late at night will disturb the sleep of family members and neighbors. The current audio equipment is not equipped with corresponding earphone interface, and earphones cannot be used. The volume can only be lowered or silenced, and this affects the perception.

Secondly, many people play music to relax after returning home from work. The range of sound transmitted by mobile phones is limited. Additional Bluetooth speakers need to be purchased, and this increases expenses. At the same time, television speakers themselves need to be stored and occupy space, and the usage rate is low.

SUMMARY

In order to overcome the shortcomings of the prior art, the purpose of the present application is to provide a soundbar with wireless earphones.

The present application is realized through the following technical measures. The soundbar with wireless earphones includes a soundbar housing, a storage compartment provided in the soundbar housing, a storage groove formed in the storage compartment, and a wireless earphone fittingly mounted in the storage groove.

A pogo pin is disposed in the storage groove, and a corresponding connecting contact is provided on the wireless earphone. The connecting contact is electrically connected to the pogo pin to form a charging path when the wireless earphone is placed in the storage groove.

A mainboard is provided in the soundbar housing, and an audio Bluetooth module is integrated on the mainboard for associating with an equipment. The wireless earphone is in communicating connection with the soundbar through the audio Bluetooth module.

As a preferred embodiment, the storage compartment further includes an earphone charging board electrically connected to the mainboard, the earphone charging board is disposed at a bottom of the storage compartment, and the pogo pin is protruded from and mounted on the earphone charging board.

As a preferred embodiment, the wireless earphone is provided therein with an earphone charging small board and an earphone mainboard that are electrically connected to each other, and the connecting contact is provided on the earphone charging small board.

As a preferred embodiment, the storage groove is a positioning groove, and the positioning groove is engaged with a case of the wireless earphone.

As a preferred embodiment, an earphone magnet is provided in the wireless earphone, the storage compartment is provided with a storage magnet, and the earphone magnet is magnetically connected to the storage magnet so that the wireless earphone is installed in the storage compartment.

As a preferred embodiment, the wireless earphone further includes an earphone front case, an earphone speaker, an earphone battery, an earphone rear case and an earphone end plug, the earphone end plug is provided with a through hole, and the connecting contact is correspondingly disposed at the through hole.

As a preferred embodiment, the storage compartment further includes a storage compartment push button and a storage compartment cover, and the storage compartment cover is connected to an opening of the storage compartment through a rotating shaft.

A spring is connected to a bottom of the storage compartment push button, and an undercut is provided on both sides. When the spring is pressed, the undercut moves aside, thereby opening the storage compartment cover.

As a preferred embodiment, the storage compartment cover is further provided with an induction magnet.

As a preferred embodiment, the soundbar housing includes a front housing and a rear housing that are connected to each other, and an end cap is correspondingly provided at two sides of a junction of the front housing and the rear housing.

As a preferred embodiment, a speaker assembly, a bass speaker, an inverter tube, a push button board and a push button are further provided in the soundbar housing, and the speaker assembly, the bass speaker, the inverter tube, and the push button board are all electrically connected to the mainboard.

In summary, due to the adoption of the above technical solution, the beneficial effects of the present application are:

First of all, a soundbar is used to replace the traditional sound system. It can be connected to a television and hung on the wall for the television. It is convenient for storage and reasonable in space arrangement.

Secondly, the soundbar is provided with a storage compartment for accommodating the wireless earphones. The wireless earphones can be placed in the storage compartment for charging when not in use or when the battery is low. The wireless earphones are connected to the soundbar for audio interaction with the soundbar. When watching television and a relatively quiet environment is needed, the sound transmitted by the television can be played through the wireless earphones. This improves the convenience of life.

Moreover, a Bluetooth module is integrated in the soundbar. This is convenient for associating and connecting with mobile phones and other devices. This increases the utilization rate of audio equipment. It provides users with more choices with different methods for using in different scenarios.

Figure 1:
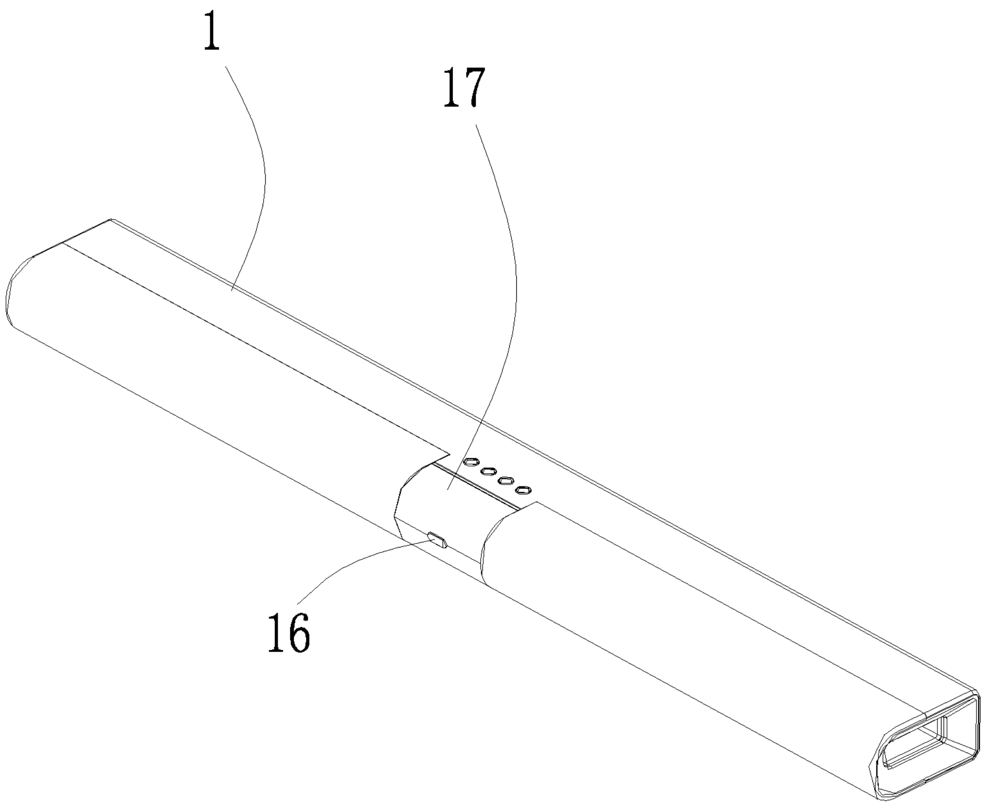
FIG. 1 is an overall schematic diagram of a soundbar.

Reference numbers in the figures and names: 1. Soundbar housing 2. Storage compartment 3. Storage groove 4. Wireless earphone 5. Mainboard 6. Earphone charging board 7. Earphone charging small board 8. Earphone mainboard 9. Earphone magnet 10. Storage magnet 11. Earphone front case 12. Earphone speaker 13. Earphone battery 14. Earphone rear case 15. Earphone end plug 16. Storage compartment push button 17. Storage compartment cover 18. Induction magnet 19. Front housing 20. Rear housing 21. End cap 22. Speaker assembly 23. Bass speaker 24. Inverter tube 25. Push button board 26. Push button 27. Spring

DETAILED DESCRIPTION

The present application is described in further detail below in conjunction with the embodiments and with reference to the accompanying drawings.

The soundbar with wireless earphones, referring to FIG. 1 to FIG. 4, may include a soundbar housing 1, a storage compartment 2 provided in the soundbar housing 1, a storage groove 3 formed in the storage compartment 2, and a wireless earphone 4 fittingly mounted in the storage groove 3. The storage compartment 2 may be disposed in a front housing 19 of the soundbar. There are two storage grooves 3 in which two wireless earphones 4 can be placed respectively.

A pogo pin may be provided in the storage groove 3. A corresponding connecting contact may be provided in the wireless earphone 4. The connecting contact is electrically connected with the pogo pin to form a charging path when the wireless earphone 4 is placed in the storage groove 3.

Specifically, the storage compartment 2 may further include an earphone charging board 6 electrically connected to the mainboard 5. The earphone charging board 6 may be disposed at a bottom of the storage compartment 2. The wireless earphone 4 is provided therein with an earphone charging small board 7 and an earphone mainboard 8 that are electrically connected to each other. The connecting contact may be provided on the earphone charging small board 7. The pogo pin is protruded from and mounted on the earphone charging board 6. When the wireless earphone 4 is placed in the storage groove 3, the connecting contact and the pogo pin are in a corresponding setting. When the storage compartment cover 17 is pulled down, the connecting contact and the pogo pin are tightly pressed against each other. When the wireless earphone 4 does not have enough power, it can be charged.

The soundbar housing 1 may be further provided therein with a mainboard 5. An audio Bluetooth module may be integrated on the mainboard 5 for associating with an equipment. The wireless earphone 4 is in communicating connection with the soundbar through the audio Bluetooth module. The Bluetooth module is integrated on the mainboard 5 of the soundbar. The Bluetooth module can be connected to smart electronic devices, including wireless earphones 4 and mobile phones, etc. via Bluetooth. It has many different application scenarios.

In one embodiment, in an application scenario of the wireless earphone 4, the soundbar can be connected to a television. The wireless earphone 4 can be charged through the soundbar and play audio through communicating connection. The user can watch dramas with high sound quality quietly without interfering others.

In another embodiment, in an application scenario of a mobile phone, the mobile phone can be directly connected to the soundbar via Bluetooth. The user can play music and videos in the mobile phone. This can achieve clear, loud, and high-quality music through the soundbar, and effectively improve the utilization and added value of the sound quality of the television.

Figure 2:
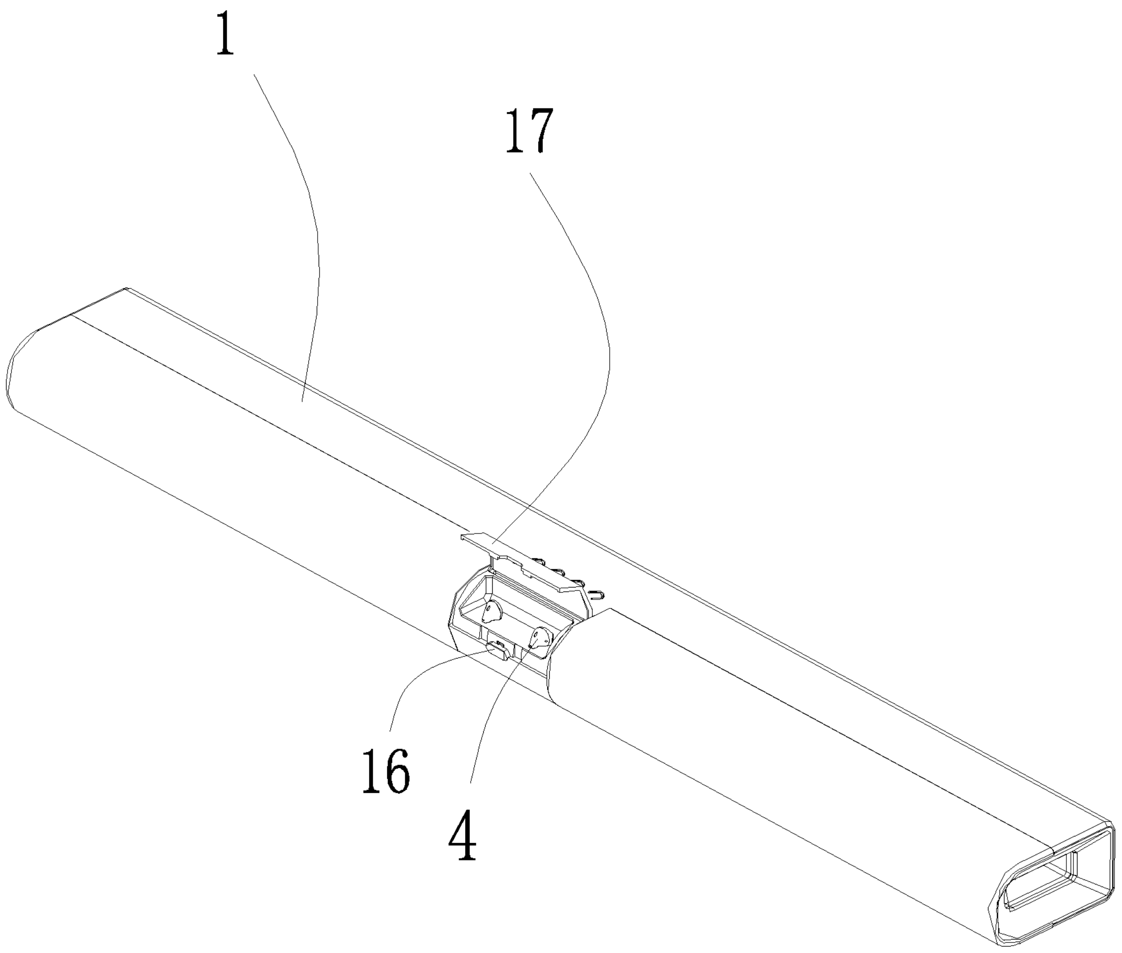
FIG. 2 is a schematic diagram showing a storage compartment cover which is opened.
Figure 3:
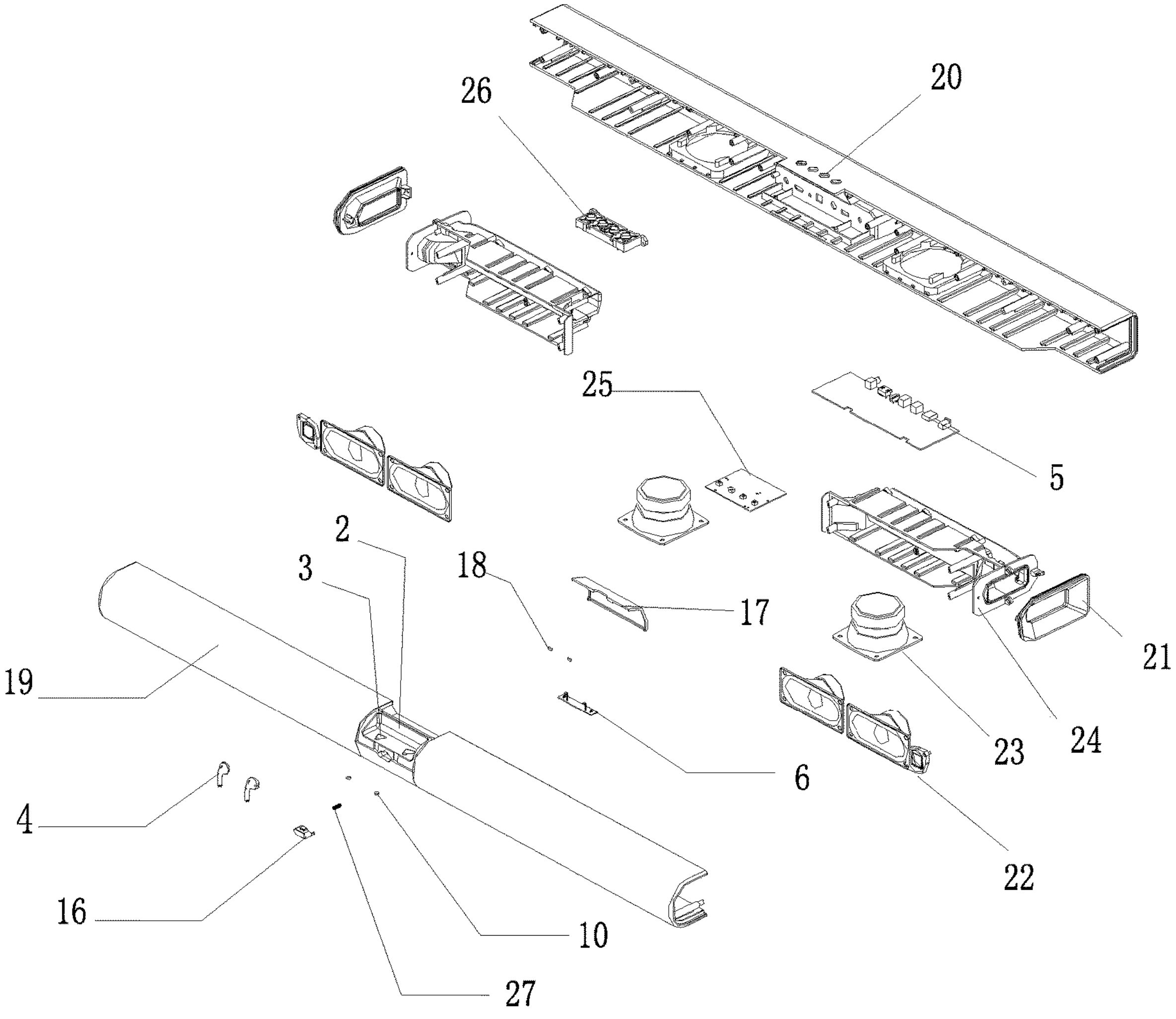
FIG. 3 is an exploded schematic diagram of the soundbar.

In the present embodiment, referring to FIG. 2 and FIG. 3, the storage groove 3 can be a positioning groove, and the positioning groove 3 is engaged with a case of the wireless earphone 4. The wireless earphone 4 includes a left earphone and a right earphone, which can be put into correspondingly shaped positioning grooves respectively. The shape of the case of the left earphone and the right earphone is adaptive to a human ear. Misplacement of the left earphone and the right earphone can be avoided by limiting the position of an end rod of the rear case 14 of the earphone in the positioning groove.

Figure 4:
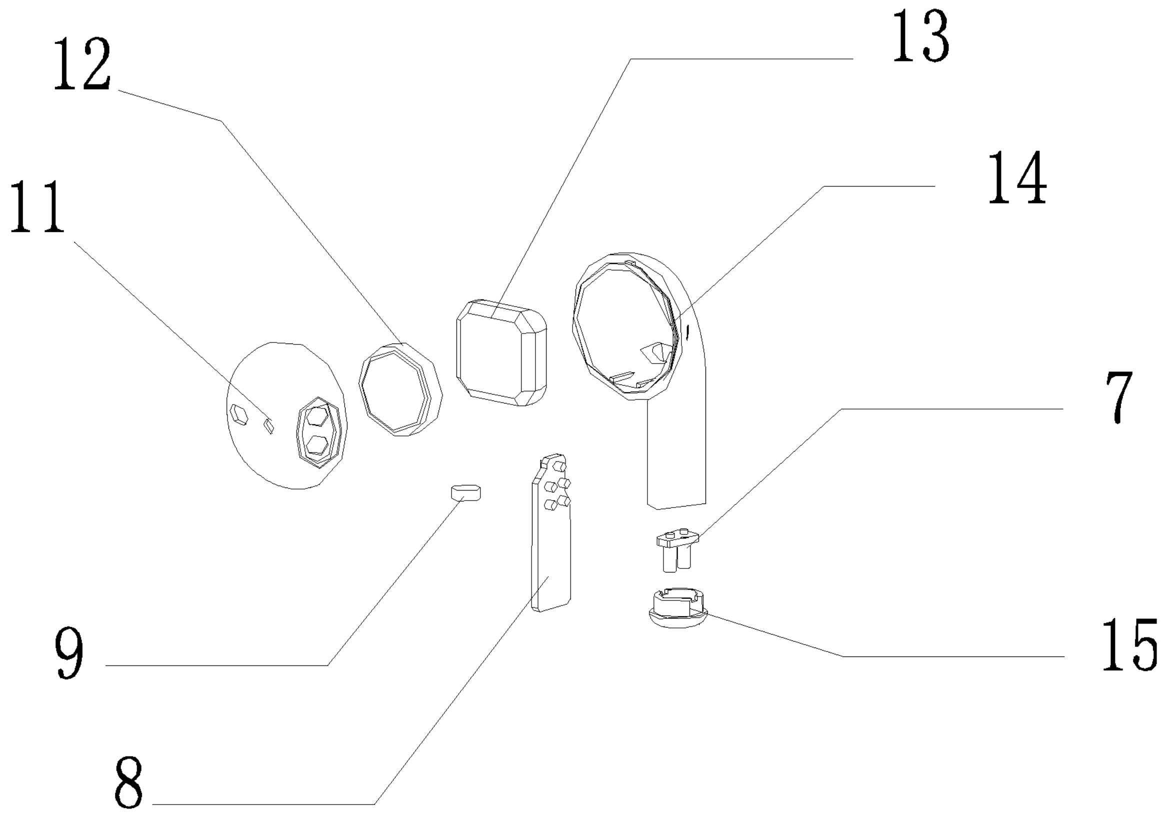
FIG. 4 is an exploded schematic diagram of a wireless earphone.

In the present embodiment, with reference to FIG. 3 and FIG. 4, an earphone magnet 9 may be provided in the wireless earphone 4. The storage compartment 2 may be provided with a storage magnet 10. The earphone magnet 9 can be magnetically connected to the storage magnet 10 so that the wireless earphone 4 can be installed in the storage compartment 2. Through magnetic attraction between the earphone magnet 9 in the wireless earphone 4 and the storage magnet 10 in the storage compartment 2, the wireless earphone 4 can be magnetically held tightly in the storage compartment 2.

In the present embodiment, referring to FIG. 4, the wireless earphone 4 may further include an earphone front case 11, an earphone speaker 12, an earphone battery 13, an earphone rear case 14, and an earphone end plug 15. The earphone end plug 15 may be provided with a through hole, and the connecting contact can be correspondingly disposed at the through hole. The earphone speaker 12 can be installed in an installation slot of the earphone front case 11. The earphone mainboard 8 can be inserted into a positioning slot of the earphone rear case 14. The earphone charging board 7 may be mounted in the earphone end plug 15. The earphone end plug 15 may be inserted into the earphone rear case 14. The earphone battery 13 may be installed in a cavity of the earphone rear case 14. The earphone front case 11 and the earphone rear case 14 are connected together.

In the present embodiment, with reference to FIGS. 1 to 3, the storage compartment 2 may further include a storage compartment push button 16 and a storage compartment cover 17. The storage compartment cover 17 may be connected to an opening of the storage compartment 2 through a rotating shaft. Two protruded sides of the storage compartment cover 17 may be provided with engaging grooves. The storage compartment 2 may be provided with a corresponding rotating shaft. The rotating shaft can be inserted into the engaging grooves of the storage compartment cover 17. The storage compartment cover 17 can be flipped about the storage compartment 2 to open and close the storage compartment 2.

In the present embodiment, referring to FIG. 1 to FIG. 3, a spring 27 may be connected to a bottom of the storage compartment push button 16, and an undercut may be provided on both sides. When the spring 27 is pressed, the undercut moves aside, thereby opening the storage compartment cover 17. The spring 27 and the storage compartment push button 16 may be disposed in the storage groove 3. Two sides of the storage compartment push button 16 may be provided with undercuts, so that the storage compartment push button 16 can be engaged in the storage groove 3. When the storage compartment push button 16 moves back and forth along the spring 27, it will not fall off.

The storage compartment cover 17 may be further provided with an induction magnet 18. When the storage compartment cover 17 is closed, the induction magnet 18 is magnetically drawn to the storage compartment 2.

In the present embodiment, referring to FIG. 3, the soundbar housing 1 includes a front housing 19 and a rear housing 20 that are connected to each other. An end cap 21 may be correspondingly provided at two sides of a junction of the front housing 19 and the rear housing 20. A speaker assembly 22, a bass speaker 23, an inverter tube 24, a push button board 25 and a push button 26 may be further provided in the soundbar housing 1. The speaker assembly 22, the bass speaker 23, the inverter tube 24, and the push button board 25 are all electrically connected to the mainboard 5. The speaker assembly 22, the inverter tube 24 and the end cap 21 may be installed in sequence in the front housing 19. The push button board 25, the push button 26, the mainboard 5 and the bass speaker 23 may be installed in sequence in the rear housing 20.

The above is an elaboration of the soundbar with wireless earphones of the present application, which is used to help understand the present application. However, the implementation of the present application is not limited by the above-mentioned embodiments. Any changes, modifications, substitutions, combinations, and simplifications without deviation from the principle of the present application should all be equivalent replacement means, and are all included in the scope of protection of the present application.

What is claimed is:

1. A soundbar with wireless earphones, comprising:

a soundbar housing;

a storage compartment provided in the soundbar housing;

a storage groove formed in the storage compartment;

a wireless earphone fittingly mounted in the storage groove;

a pogo pin disposed in the storage groove;

a corresponding connecting contact provided in the wireless earphone, the connecting contact being electrically connected to the pogo pin to form a charging path when the wireless earphone is placed in the storage groove;

a mainboard mounted in the soundbar housing; and an audio bluetooth module integrated on the mainboard and adapted to associate with an equipment, the wireless earphone being in communicating connection with the soundbar through the audio bluetooth module.

2. The soundbar with wireless earphones according to claim 1, wherein the storage compartment further comprises an earphone charging board electrically connected to the mainboard, the earphone charging board is disposed at a bottom of the storage compartment, and the pogo pin is protruded from and mounted on the earphone charging board.

3. The soundbar with wireless earphones according to claim 2, wherein the storage compartment further comprises a storage compartment push button and a storage compartment cover, and the storage compartment cover is connected to an opening of the storage compartment through a rotating shaft; a spring is connected to a bottom of the storage compartment push button, and an undercut is provided on both sides of the storage compartment push button, when the spring is pressed, the undercut moves aside, thereby opening the storage compartment cover.

4. The soundbar with wireless earphones according to claim 3, wherein the storage compartment cover is further provided with an induction magnet.

5. The soundbar with wireless earphones according to claim 1, wherein the wireless earphone is provided therein with an earphone charging small board and an earphone mainboard that are electrically connected to each other, and the corresponding connecting contact is provided on the earphone charging small board.

6. The soundbar with wireless earphone according to claim 5, wherein the wireless earphone further comprises an earphone front case, an earphone speaker, an earphone battery, an earphone rear case and an earphone end plug, the earphone end plug is provided with a through hole, and the connecting contact is correspondingly disposed at the through hole.

7. The soundbar with wireless earphones according to claim 1, wherein the storage groove is a positioning groove, and the positioning groove is engaged with a case of the wireless earphone.

8. The soundbar with wireless earphones according to claim 1, wherein an earphone magnet is provided in the wireless earphone, the storage compartment is provided with a storage magnet, and the earphone magnet is magnetically connected to the storage magnet so that the wireless earphone is installed in the storage compartment.

9. The soundbar with wireless earphones according to claim 1, wherein the soundbar housing comprises a front housing and a rear housing that are connected to each other, and an end cap is correspondingly provided at two sides of a junction of the front housing and the rear housing.

10. The soundbar with wireless earphones according to claim 1, wherein a speaker assembly, a bass speaker, an inverter tube, a push button board and a push button are further provided in the soundbar housing, and the speaker assembly, the bass speaker, the inverter tube and the push button board are all electrically connected to the mainboard.

* * * * *